US00RE47426E

(19) United States
(12) Reissued Patent
Selwa

(10) Patent Number: US RE47,426 E
(45) Date of Reissued Patent: Jun. 11, 2019

(54) 360 DEGREE ROTATIONAL EASEL

(71) Applicant: Robert Allen Selwa, Saint Clair Shores, MI (US)

(72) Inventor: Robert Allen Selwa, Saint Clair Shores, MI (US)

(21) Appl. No.: 15/857,466

(22) Filed: Dec. 28, 2017

Related U.S. Patent Documents

Reissue of:
(64) Patent No.: 9,220,343
Issued: Dec. 29, 2015
Appl. No.: 14/197,103
Filed: Mar. 4, 2014

(51) Int. Cl.
*A47B 19/00* (2006.01)
*A47B 97/04* (2006.01)

(52) U.S. Cl.
CPC ..... *A47B 97/04* (2013.01)

(58) Field of Classification Search
CPC ..... A47B 17/06; A47B 17/065; A47B 97/00; A47B 97/001; A47B 97/005; A47B 97/02; A47B 97/04; A47B 97/08; A27B 27/00; A27B 27/02; A27B 27/18; F16M 2200/022
See application file for complete search history.

(56) References Cited

U.S. PATENT DOCUMENTS 278,116 A * 5/1883 Fisher ..... A47B 97/08 248/449
974,067 A 10/1910 Johnson
3,632,101 A * 1/1972 Ross ..... A47B 97/04 269/254 R
3,926,398 A 12/1975 Vincent ..... A47B 97/08 248/448
4,109,892 A 8/1978 Hartung
4,717,109 A * 1/1988 Johnston ..... 248/441.1
5,205,526 A * 4/1993 Deutsch ..... A47B 97/08 248/188.8
5,725,192 A * 3/1998 Cloninger ..... A47B 97/04 248/447
5,791,623 A 8/1998 Louridas
6,390,433 B1 5/2002 Kasa-Djukic
6,698,705 B2 3/2004 Toghanian
6,712,328 B1 3/2004 Morton
6,889,952 B2 * 5/2005 Cook et al. ..... A47B 97/08 248/448
7,380,765 B2 6/2008 Shiff ..... A47B 97/04 248/124.1
7,540,464 B2 * 6/2009 Samari ..... 248/445
7,686,275 B2 * 3/2010 Scarcello ..... 248/480
8,607,976 B2 * 12/2013 Wu et al. ..... 206/320
(Continued)

*Primary Examiner* — Patricia L Engle

(57) ABSTRACT

A detachable rotatable easel conversion kit used to modify and convert an existing easel stand and/or camera tripod into a rotating easel. The kit consists of a portable tabletop easel stand, a rotational assembly, sliding bar clamps, a clamping mechanism, a camera tripod adapter, hardware, and instructions. The work piece is secured by sliding bar clamps as part of the rotational assembly and secured to the easel stand with the clamping mechanism, or to a camera tripod mount using the adapter. The work piece can be rotated a full 360 in either direction with variable tension. L-grips on the sliding bar clamps allow a canvas stretcher to be pulled up from behind for unobstructed access to all four edges of the work piece.

2 Claims, 22 Drawing Sheets

DETACHABLE CLAMP-ON EMBODIMENT
W/MOUNTED CANVAS

(56) References Cited

U.S. PATENT DOCUMENTS

| | | | | |
|---|---|---|---|---|
| 2002/0056794 | A1* | 5/2002 | Ibrahim | A47B 19/00<br>248/177.1 |
| 2002/0066630 | A1* | 6/2002 | Brown, Sr. | A47B 3/10<br>190/11 |
| 2007/0040089 | A1* | 2/2007 | Shiff | A47B 97/04<br>248/448 |

* cited by examiner

FIGS. 1A, 1B, 1C & 1D
PORTABLE TABLETOP
EASEL STAND – FRONT VIEW
FIG. 1A
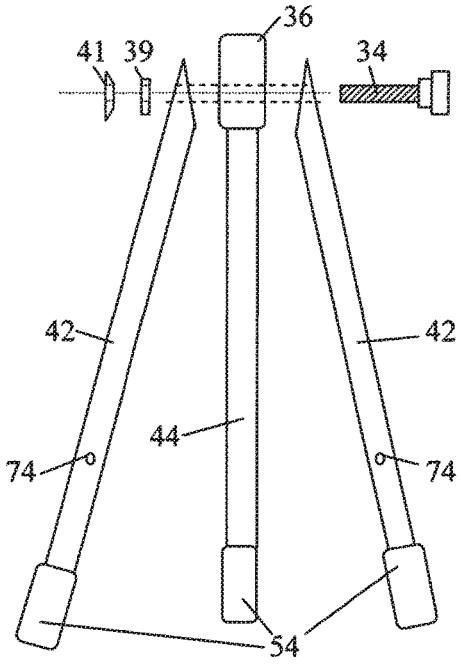
FIG. 1B
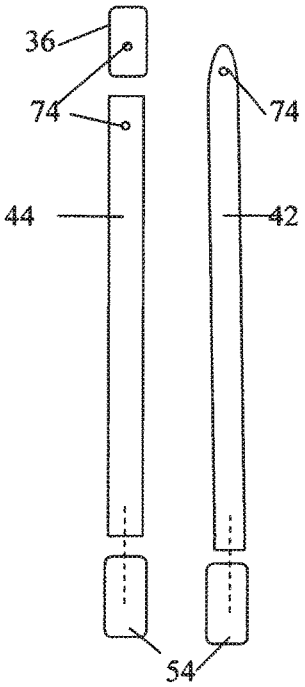
FIG. 1C
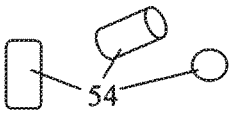
FIG. 1D
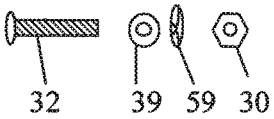

EASEL STAND
W/REST BAR
FRONT VIEW

EASEL STAND
W/REST BAR
(PARTIAL) SIDE VIEW

DETACHABLE EASEL
W/ CLAMPING BARS
1 ARM
FRONT VIEW

DETACHABLE EASEL
W/ CLAMPING BARS
2 ARMS
FRONT VIEW

ROTATIONAL ARM & CLAMPING BAR ASSEMBLIES -TOP VIEW- ONE OR TWO BARS

ROTATING ARM ASSEMBLY & REAR BRACE PLATE SIDE VIEW – 2 BARS & 1 BAR

DETACHABLE EASEL
ROTATIONAL ARM AND
FRONT BRACE PLATE
REAR VIEW - 1 BAR

DETACHABLE EASEL
ROTATIONAL ARM AND
FRONT BRACE PLATE
REAR VIEW – 2 BARS

DETACHABLE EASEL
FRONT CLAMPING BAR AND
REAR BRACE PLATE
FRONT VIEW

CLAMP-ON CAMERA TRIPOD MODEL
FRONT VIEW – ONE BAR w/L-GRIPS

CLAMP-ON CAMERA TRIPOD MODEL
2 BARS - FRONT VIEW W/L-GRIPS

CLAMP-ON CAMERA TRIPOD ASSEMBLY
SIDE VIEW

CLAMP-ON CAMERA TRIPOD ADAPTER
REAR VIEW

ROTATIONAL ARM
ASSEMBLY
SIDE VIEW

SLIDING BAR CLAMP
w/L-GRIPS
TOP VIEW

SLIDING BAR CLAMP-
SIMPLE DESIGN
FRONT VIEW

SLIDING BAR
CLAMP WITH
L-GRIPS
FRONT VIEW

SLIDING BAR
CLAMP WITH
L-GRIPS
REAR VIEW

SLIDING BAR
CLAMP ASSEMBLY
WITH L-GRIPS
SIDE VIEW

SLIDING BAR CLAMP
W/O L-GRIPS
REAR VIEW

BENT FLAT BAR-
L-GRIP

ROTATIONAL ARM
TOP VIEW

ROTATIONAL BARS
2- ARMS ON
FRONT CIRCULAR
BRACE PLATE
TOP VIEW

ROTATIONAL BAR
1- ARM ON
FRONT CIRCULAR
BRACE PLATE
TOP VIEW

DETACHABLE CLAMP-ON EMBODIMENT
W/MOUNTED CANVAS

FIG. 6A & 6B
DETACHABLE CLAMPING BAR
EMBODIMENT -
FOR MOUNTING ON AN EASEL WITH A
CENTER ARM BRACE
FRONT VIEW
FIG. 6A
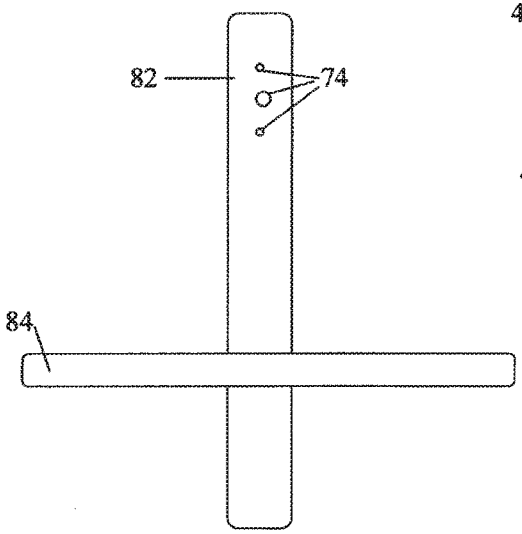
SIDE VIEW
FIG. 6B
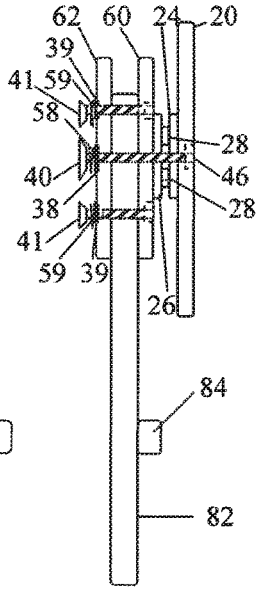

CLAMP-ON EASEL
ON CAMERA TRIPOD
SIDE VIEW (SKETCH)

PORTABLE EASEL STAND W/BOX AND INSTRUCTIONS (SKETCH)

ROTATIONAL ARM ASSEMBLY
(SKETCH)

CLAMPING BAR ASSEMBLY
(SKETCH)

CAMERA TRIPOD ADAPTER ASSEMBLY
(INCLUDING HARDWARE)
(SKETCH)

FIGS. 12A & 12B
L-GRIPS GRIPPING A CANVAS FROM BEHIND (SKETCH)
FIG. 12A
Rear View
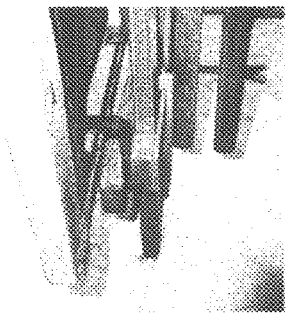
FIG. 12B
Front View
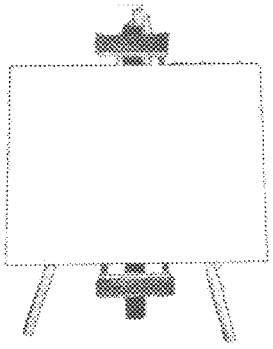
FIG. 13
ROTATIONAL ASSEMBLY WITH THE CLAMPING BAR ASSEMBLY
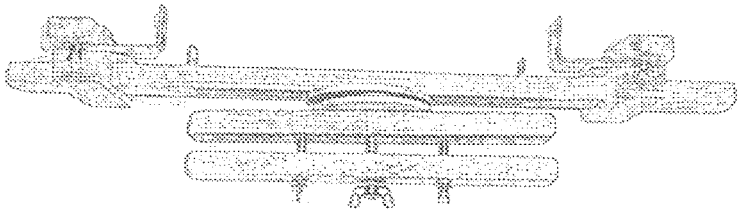

ROTATIONAL ARM ASSEMBLY WITH CAMERA TRIPOD ADAPTER ASSEMBLY (SKETCH)

ROTATIONAL ARM ASSEMBLY WITH CAMERA TRIPOD ADAPTER ASSEMBLY (ZOOM IN) (SKETCH)

ADAPTED CENTER ARM BRACE ON A STANDARD EASEL (VARIOUS STAGES) (SKETCH)

360 DEGREE ROTATIONAL EASEL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the benefit of provisional patent application Ser. No. 61/851,140 filed Mar. 4, 2013, and Ser. No. 61/959,686 filed Aug. 30, 2013 by the present inventor.

BACKGROUND

1. Field

This application relates to easels, specifically rotating artist easels and display easels.

2. Background of the Invention

Most every visual artist and presenter requires an easel to display and secure their articles. Many easel designs have been devised to facilitate the needs of the user for functionality, and ease of use.

Recently, the creation of art has increasingly focused more on the artist, their insights, forms of expression, their understanding, and an effective use of media—so less distraction for the artist makes for a more pleasurable painting experience. This ease of use is also true of presenters that use an easel, and who would like or need to rotate their presentation for whatever reason, and would also prefer an uninterrupted flow in their presentation and free from distractions. The presenter and artist now prefer to focus on the subject at hand, rather than on the object.

Originally, the simple standard easel employed three legs, was attached at the top, and offered a bar across the front to rest the article on. Other easels, used horizontal rests that slide on a single vertical bar (or bars) to adjust the height. Some easels even offered rotational capabilities. However, a simple and inexpensive easel that grips the article securely, rotates the article 360 degrees in either direction, and can convert the standard easel and camera tripod into a rotating easel has been elusive. I found much prior art in easels, however all have fallen short in being able to deliver all the attributes and endowments my embodiment offers.

US Patent—"Easel" US392639181 1A1 1 to Melvin C. Vincent (1975) claims a rotational feature, but does not explicitly claim 360 degrees of rotation in either direction. The rotating mechanism is different from my embodiment, and so are the clamping features. US Patent—"Rotatable Easel" U.S. Pat. No. 6,712,328 B1 to Richard Joseph Morton (2004) also claims a rotational feature of "at least" 90 degrees, but not explicitly 360 degrees. Again the apparatus to rotate the canvas is different, and so is the securing mechanism. US Patent "Easel, especially for canvas frames (stretchers), for use in painting" U.S. Pat. No. 6,390,433 B1 to Vladimir Kasa-Djukic (2002) claims 360 degrees of rotation but also by a different means than my embodiment, and also employs a different clamping mechanism than my embodiment. US Patent "Paint easel and display rack assembly" U.S. Pat. No. 6,698,705 B2 (2004) to Toghanian Jahanbakhsh claims adjustable angles and rotational qualities but not specifically 360 degrees. This embodiment is again different from my embodiment in the angles of rotation, the method for changing the angle of the composition, and the securing mechanism. US Patent "Multi-position presentation easel" U.S. Pat. No. 6,889,952 B2 (2005) to Ronald D. Cook & Pamela J. Emken claims rotational features. Again the apparatus to rotate the canvas is different, and so is the securing mechanism. US Patent U.S. Pat. No. 4,109,892 "Adjustable easel" (1977) to John P. Hartung claims 360 degree rotation and a tilting feature. Here again, the rotating mechanism is different from my embodiment, and so are the clamping and tilting features. US Patent "Adjustable easel for supporting a work piece" 2008-06-03 (U.S. Pat. No. 7,380,765) to Harold H. Schiff claims rotational and tilting features and is on the market as the "Windmill Easel". However, this embodiment has a different rotating mechanism than my embodiment, and also has a dissimilar clamping mechanism. The "Windmill Easel" and my device are dissimilar in design and engineering, with the "Windmill Easel" being much more complicated, costlier to manufacture, and this is reflected in a price of ten times more to the consumer. Considering that most artists have a small budget to work with, the "Windmill Easel," is more of a luxury item for established artists than an economical way of providing these tilting and rotational features to mainstream artists. The "Windmill Easel" is not an inexpensive conversion kit to modify many standard easel stands and camera tripods into a rotatable easel. Nor is my embodiment "in the spirit" of the "Windmill Easel".

None of the prior art that I could find solved all the technical and practical problems of cost and versatility that my embodiments have resolved. After untangling the problems I encountered in the design and building of the prototypes, the prior art I then found employed rotational features more complicated and costly than my design, and the prior art wasn't specifically designed as a conversion kit.

SUMMARY OF THE INVENTION

The idea of this embodiment is to provide an effective and inexpensive solution and means to convert most existing standard easels and/or camera tripods into a 360 degree rotational easel and resolve the cost concerns of many artists for this rotational feature. This conversion feature and the simplicity in design now allow most cost conscious artists the ability to afford and enjoy the use of a rotational easel.

The advantages of these embodiments are that the rotational device is simple, easy and cheap to manufacture and repair, and can be constructed with a wide choice of materials, and readily available parts. Another advantage of a rotating easel is that this added rotational capacity now allows for painting in otherwise awkward angles, and adds the easel's ability of the easel to easily rotate the canvas to check the composition all the while without interruption, and the dirtying of the hands, or the composition. There is also an advantage of portability in this embodiment because of its light-weight design.

BRIEF DESCRIPTION OF THE DRAWINGS

FIGS. 1A to 1F illustrate components of a basic easel stand.

FIGS. 6A-B illustrates the conversion of an existing easel with a center arm brace (as an example) using the clamping bar assembly.

FIGS. 12A and 12B are front and rear sketches illustrating the use of the L-Grips gripping a canvas stretcher from behind.

FIG. 13 is a sketch illustrating the coupling of the rotational assembly with the clamping bar assembly.

Figure 1E:
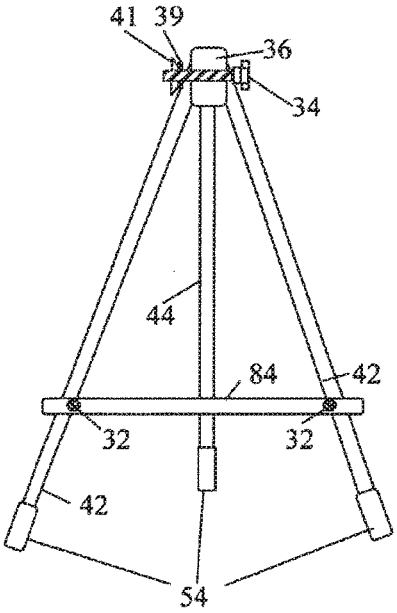

| DRAWINGS - Reference Numerals |
|---|
| 20 - Rotational Arm |
| 22 - Sliding Bar Clamp Assembly |
| 23 - Circular Brace Plate (large) |
| 24 - Circular Front Brace Plate (small) |
| 26 - Circular Rear Brace Plate (small) |
| 28 - Felt Pads |
| 30 - Backing Plate |
| 32 - Screw |
| 34 - Carriage Bolt |
| 36 - PVC40 Cap Slip |
| 38 - Flat Washer (large) |
| 39 - Flat Washer (small) |
| 40 - Wing Nut (large) |
| 41 - Wing Nut (small) |
| 42 - PVC40 Pipe Side Leg |
| 44 - PVC40 Pipe Center Leg |
| 46 - Hex Bolt (large) |
| 47 - Hex Bolt (small) |
| 48 - Insert Nut (large) |
| 49 - Insert Nut (small) |
| 50 - Thumb Screw |
| 52 - Bent Flat Bar L - Grip |
| 54 - Vinyl Cap |
| 56 - Nylon Lock Nut |
| 58 - Lock Nut Washer (large) |
| 59 - Lock Nut Washer (small) |
| 60 - Front Clamping Bar |
| 62 - Rear Clamping Bar |
| 64 - Nails |
| 66 - Glue |
| 68 - Wing Screw |
| 70 - Female Tripod Mount |
| 72 - Male Tripod Adapter |
| 74 - Drill Hole |
| 76 - Bored Out Hole |
| 78 - Rear Bar Clamp Guide & Brace |
| 80 - Front Facing Bar |
| 62 - Center Arm |
| 84 - Rest Bar |

DRAWINGS

Parts List—Detailed Description

20—Rotational Arm—used as a component to secure, brace, and rotate the work piece.

21—Rotational Arm Assembly—consists of the rotational arm (20), front brace plate (24), felt pads (28) and the following parts (38, 40, 46, 58, 64, 66).

22—Sliding Bar Clamp Assembly—used to secure the work piece on the rotational arm (20). Comprised of parts (48, 49, 50, 52, 66, 68, 78, 80).

24—Circular Front Brace Plate—attached to the rotational arm(s) (20), with a set of attached felt pads (28) to slide against a circular rear brace plate (26).

26—Circular Rear Brace Plate—attached to the rear clamping bar (62), or the male tripod adapter (72), and provides the surface for the front brace plate (24) with the felt pads (28) to slide on.

28—Felt Pads—used as a cushion to help facilitatec the slide-ability and frictional function between the two circular brace plates (24, 26).

30—Standard nut—to secure the rest bar.

32—Machine Screw—used to secure the rest bar (84) to the easel side legs (42).

34—Carriage Bolt—used at the top of the legs (42, 44) to secure and hold the three legs together.

36—PVC40 Cap Slip—used to top the center leg (44).

38—Flat Washer (large)—used as a spacer for the nuts to slide on.

39—Flat Washer (small)—used as a spacer for the nuts to slide on.

40—Nylon Locking Wing Nut (large)—used to tighten the rotational arm assembly (21) to the clamping bars (60, 62) with the large flat washer (38) and center hex bolt (46).

41—Wing Nut (small)—used in the clamping bar assembly to tighten in the back the side hex bolts (47) entering through the clamping bars (60, 62), along with the small flat washers (39), lock nut washers (59); and also to tighten the carriage bolt (34) with the washer (39) at the top of the legs (42, 44).

42—PVC40 Pipe Side Leg—used for side legs of the easel stand and angled at one end.

44—PVC40 Pipe Center Leg—used for the center leg of the easel stand.

46—Hex Bolt (large)—used to pivotally attach the rotational assembly (21) to the clamping bars (60, 62) with the easel legs (42) sandwiched between, and through the rear brace plate (26); and also to attach the rotational assembly (21) to the tripod adapter (72).

47—Hex Bolt (small)—for the clamping bar embodiment to hold the front (60) and rear clamping bars (62) together.

48—Insert Nut (large)—used in the sliding bar clamp assemblies (22) to enable the thumb screws (50) to tighten the sliding bar clamps to the rotational arm (20).

49—Insert Nut (small)—used in the sliding bar assemblies (22) to allow the wing screw (68) to tighten the L-grips (52) onto the rear of the sliding bar clamp (22).

50—Thumb Screw—passes through the insert nut (48) and is used to tighten the sliding bar clamp assembly (22) to the rotational arm (20).

52—Bent Flat Bar L-Grip—optional equipment used to pull and secure a canvas stretcher from behind, and/or to provide additional work piece support.

54—Vinyl Cap—used on the easel legs to provide a gripping function so the easel stand does not slip on the resting surface.

56—Nylon Lock Nut—used in the tripod adapter embodiment to secure the rotational arm assembly (21) to the tripod adapter (72) with the hex bolt (46) and flat washer (38).

58—Lock Nut Washer (large)—optional.

59—Lock Nut Washer (small)—optional.

60—Front Clamping Bar—used to sandwich the front of the easel legs (42), or center arm brace (82), to the rear clamping bar (62), and is also secured to the rear of the front brace plate.

62—Rear Clamping Bar—used to sandwich the back of the easel legs (42), or the center arm brace (82), to the front clamping bar (60).

63—Clamping Bar Assembly—front and rear clamping bars (60, 62), rear brace plate (26), and hardware (39, 41, 47, 59, 64, 66).

64—Nails—used to secure the rotational arm (20) to the front brace plate (24); the rear brace plate (26) to the front clamping bar (60); and the male tripod adaptor (72) to the rear brace plate (26).

66—Glue—also used to secure the plates (24, 26) to the clamping bar (60), the rotational arm (20), and the male tripod adaptor (72).

68—Wing Screw—used to secure the L-grips to the rear of the front facing bar (80) of the sliding bar assembly (22) through the small insert nut (49).

70—Female Tripod Mount—mount found on the camera tripod.

72—Male Tripod Adapter—adapter built to clamp into the camera tripod female mount.

73—Tripod Adapter Assembly—consists of the adapter (72) and rear brace plate (26) and uses parts (38, 46, 56, 64, 66).

74—Drill Hole—used for bolts to pass through.

76—Bored Out Hole—used to recess the heads of the hex bolts (46, 47) and nylon lock nut (56).

78—Rear Bar Clamp Guide & Brace—part of the sliding bar assembly glued on to the front facing bar (80). Cut at an angle complementary to the rotating arm and about ⅜" in height more than the front bar (80) to provide a lip to better brace the canvas, and together with the face bar (80) allows for the slide-ability up and down the rotational bar (20).

80—Front Facing Bar—front part of the sliding bar assembly (22) which incorporates the insert nuts (48, 49).

82—Center Arm Brace—alternative easel brace found on some easels to be adapted by the clamping bar assembly.

84—Rest Bar—to stabilize the easel, and for the work piece to rest on as a display, or regular easel.

86—Hardware package—consists of hardware packages for the assemblies.

88—Instructions—instructions for assembly, use, and care of the product, a list of parts, and templates and instructions to modify existing easels.

90—Packaging—package for rotational assembly (21), sliding bar clamp assembly (22), clamping bar assembly (63), tripod adapter assembly (73), hardware package (86), and instructions (88).

| NESSARY BUILDING TOOLS |
|---|
| 1. Hammer |
| 2. Screwdriver |
| 3. Staple gun |
| 4. Drill |
| 5. Table Saw |

-continued

| NESSARY BUILDING TOOLS |
|---|
| 6. Scroll saw |
| 7. Orbital sander |
| 8. Disk Sander |
| 9. Sabre saw |
| 10. Drill bits |

DETAILED DESCRIPTION OF THE INVENTION

The advantages of these embodiments are that the rotational device is simple, easy, and cheap to manufacture with a wide choice of materials to select from. These embodiments are versatile in scope, offering the owner the capacity to transform existing easels and camera tripods into a rotatable easel cheaply and effectively. The advantage of a rotating easel is that this added rotational capacity now allows for painting in otherwise awkward angles, and adds the ability to easily rotate the canvas to check the composition all the while without interruption, and the dirtying of the of the hands, or the composition. The simplicity of design and reduced cost enables virtually any artist or presenter to afford this rotational easel.

The challenge I faced was to create an easel that most every artist or presenter could afford, is durable, versatile, offered few moving parts, is easy to maintain and use, easy to manufacture, and offered this rotational feature. Prior art offered some of these qualities, but not all. Simplifying the rotational device and sliding bar clamps, along with allowing this rotational capability to be easily applied to existing easels and camera tripods as an economical alternative for converting pre-existing easels and camera tripods was the focus of my efforts.

Figure 5:
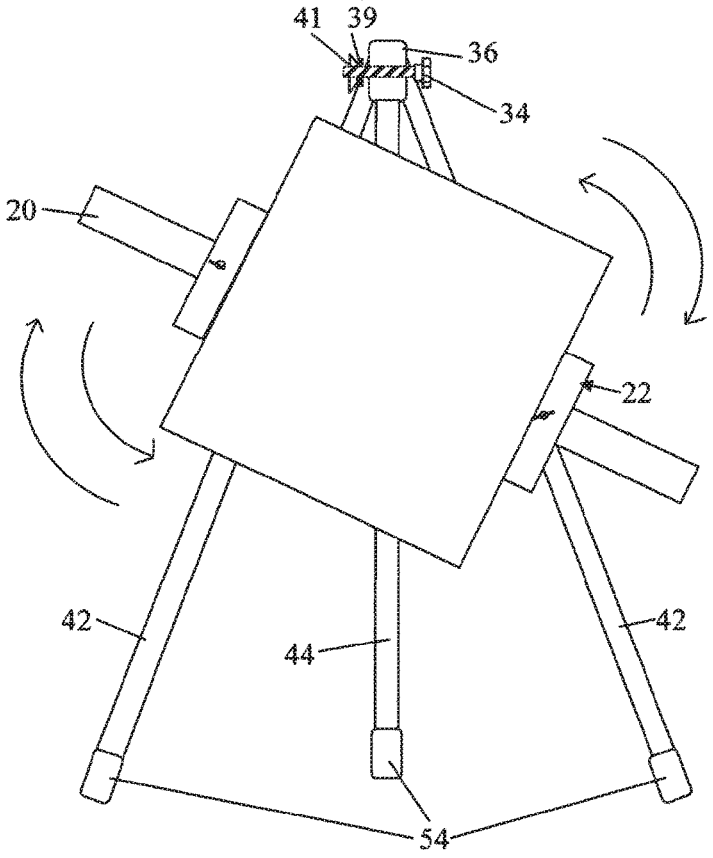
FIG. 5 illustrates a canvas mounted on an easel stand using a clamping bar assembly.

This conversion kit includes a standard display easel, a rotational assembly, a set (or two) of sliding bar clamps, a clamping bar assembly, a camera tripod adapter assembly, hardware, and instructions. The rotational assembly is secured with hardware to an existing easel with clamping bars, or onto a camera tripod with a tripod adapter and hardware, and the work piece is secured by means of the sliding bar clamp assembly sliding on the rotational arm (FIGS. 5. & 7). L-grips allow a canvas stretcher to be pulled up from behind to allow for unobstructed access to all four edges of the canvas (FIG. 12).

First Embodiment

FIG. 1A-FIG. 11—Conversion Kit

This conversion kit consists of a standard portable tabletop easel, a rotational assembly (21), a sliding bar clamp assembly (22), a clamping assembly (63), a tripod adapter assembly (73), a package of the necessary hardware (86), a set of instructions (88), and packaging (90). See FIGS. 8, 9, 10 & 11.

Operation First Embodiment

FIG. 1A-FIG. 11—Conversion Kit

Figure 16:
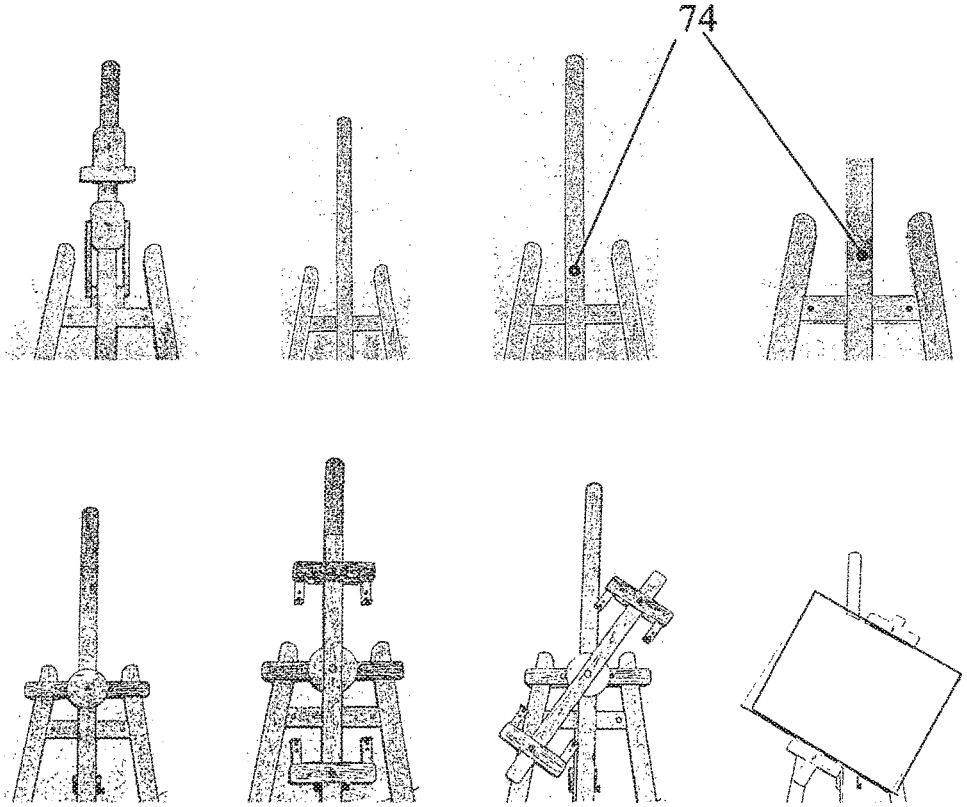
FIG. 16 is a sketch illustrating the coupling of the rotating assembly with a modified easel at various stages in its transformation.

The owner uses the included instructions to assemble the given embodiments, follows the directions on the use and care of the product, and learns how to adapt convertible pre-existing easel stands, and camera tripods. The rotational assembly (21) attaches to either the clamping bar assembly (63) and then onto the easel stand, or onto an adapted easel. (See FIG. 16.) Or, the rotational assembly (21) can attach to the included camera tripod adapter assembly (73) and then onto the female mount (70) of a compatible camera tripod (See FIG. 7).

Second Embodiment

FIGS. 1A-1F—Easel Stand

The detachable clamping bar assembly (63) utilizes the included standard easel stand found in FIGS. 1A-1F. The side legs (42) and a center leg (44) are here made of 1" PVC 40 pipe. The legs (42, 44) could be made out of any sturdy material such as wood, metal, plastic, etc. . . . . Vinyl caps (54) in FIG. 1C are placed on the bottom of the legs. The tops of the two side legs (42) are cut at an angle with a hole drilled through (FIGS. 1A, 1B). The center leg (44) has a PVC40 Cap Slip (36) placed on the top with a hole drilled through both the cap and center leg. FIGS. 1A & 1E illustrate that a carriage bolt (34) is then pushed through the holes of the side and center legs (42, 44) and secured at the other end by a small regular flat washer (39) and a wing nut (41).

Figure 1F:
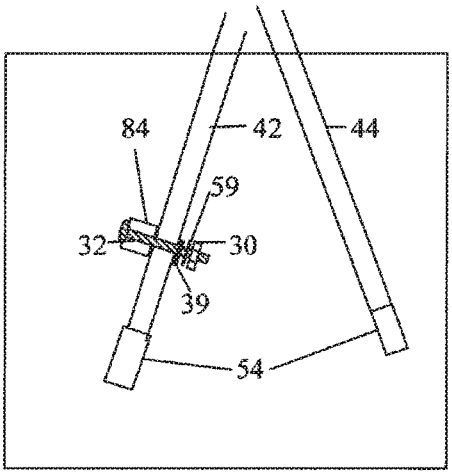

A rest (84) should be attached to the side legs (42) as shown in FIGS. 1E & 1F to stabilize the easel stand. The easel stand (FIG. 1E) is used with the clamping bar assembly and can also double as a standalone display and/or standard work easel:

Operation Second Embodiment

FIGS. 1A-1F—Easel Stand

The tension applied by the wing nut (41) determines how easily the center leg will slide between the two side legs (42). Adjusting the position of the center leg determines the angle of the work piece in relation to the table surface. The vinyl caps shown in FIGS. 1A-1C are used so the easel will not easily slide on the surface onto which the easel stand rests. The rest bar stabilizes the easel stand, and also allows the stand to double as a display easel or to be used as a standard easel without rotational features.

Third Embodiment

Figure 2A:
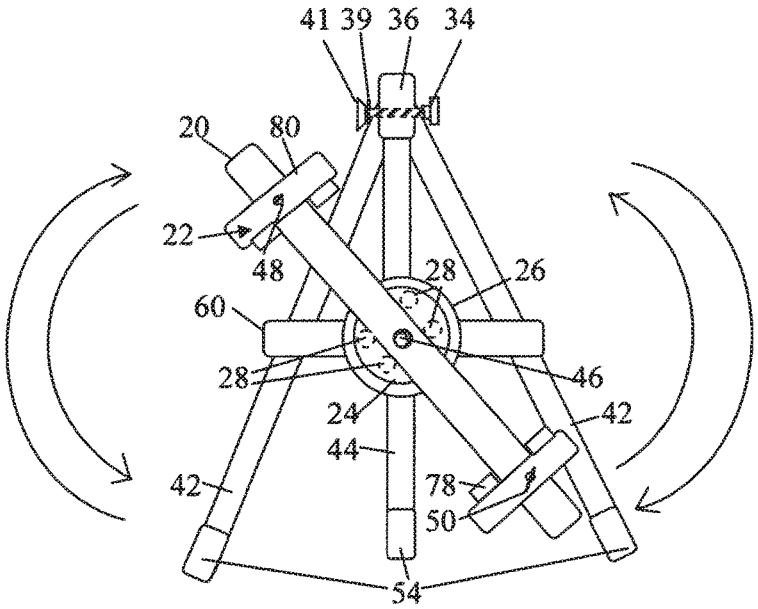
FIGS. 2A to 2G illustrate a detachable clamping bar embodiment clamped onto the standard easel, and a rotational arm assembly in one and two arm models.
Figure 2B:
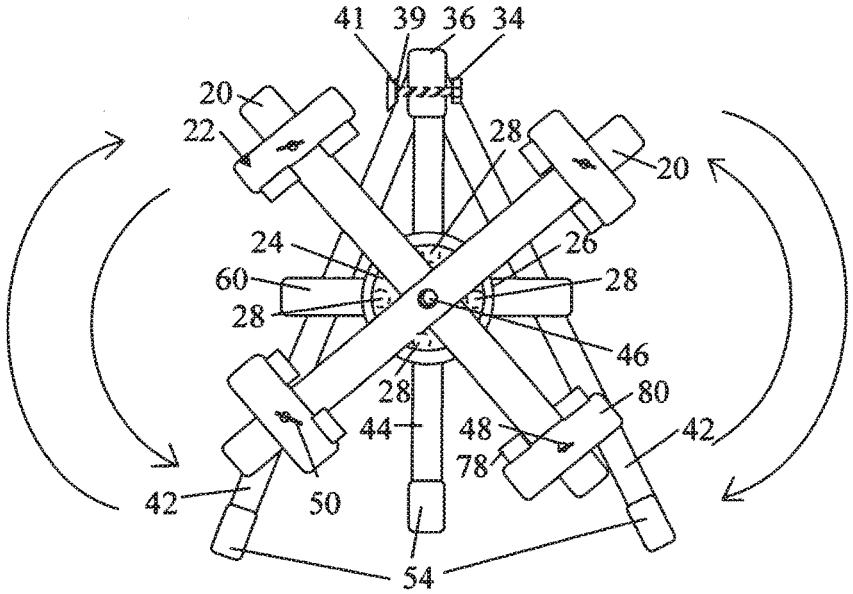
Figure 2C:
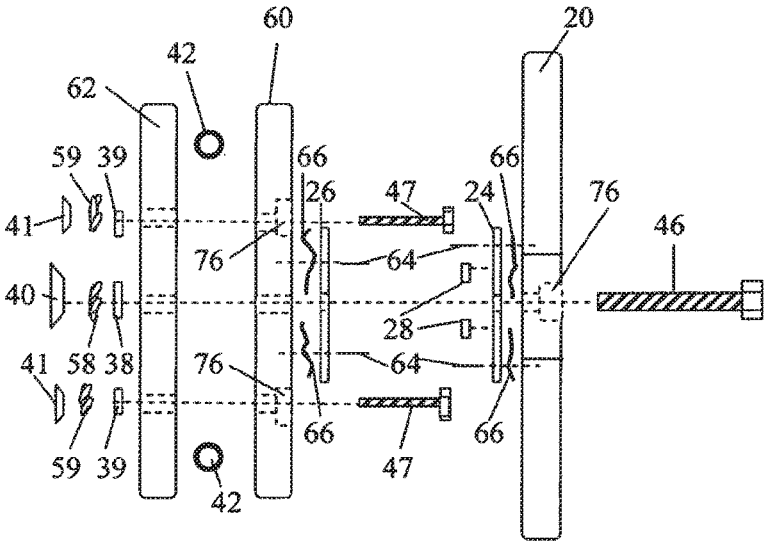

FIGS. 2A-2G, 3A-3C, 4A, 4J-4K, 5, 6B, 7, 9 & 13-16—Rotational Assembly The third embodiment is a rotational assembly (FIGS. 2C-2G, 4A and 9). This embodiment also can be made in a one or two rotational arm (20) version (FIGS. 2A & 2B). This embodiment comprises one or two rotational arms (20), a circular front brace plate (24), a set of felt pads (28), a hex bolt (46), a flat washer (38), a lock nut washer (58) (optional), and a locking wing nut (40) as illustrated in FIG. 2C. The center hex nut (46) found in FIGS. 2A-2D enters and rests securely in a bored (76) and drilled out hole (74) perpendicular through the center of the rotational arm (20), front brace plate (24), and attached to a flat washer (38), a lock nut washer (58) (optional), and nylon locking wing nut (40). The adhesive side of the felt pads (28) attach onto the back of the front brace plate (24) to provide slide-ability, and friction.

Figure 2D:
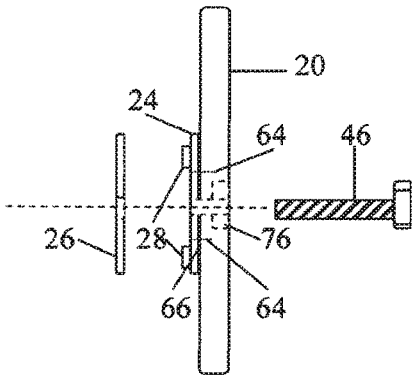
Figure 2E:
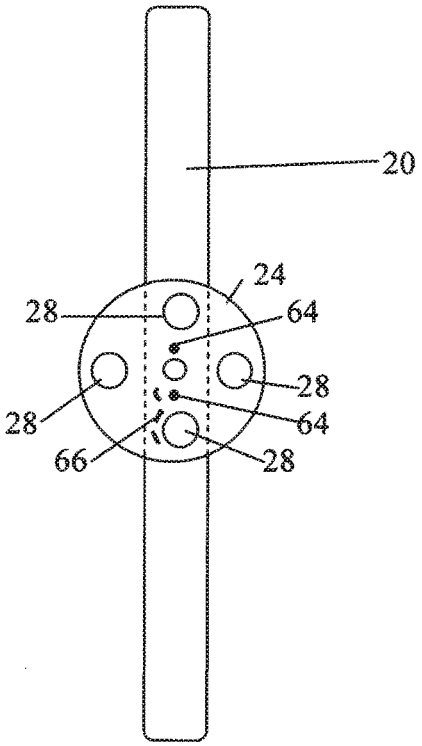
Figure 2F:
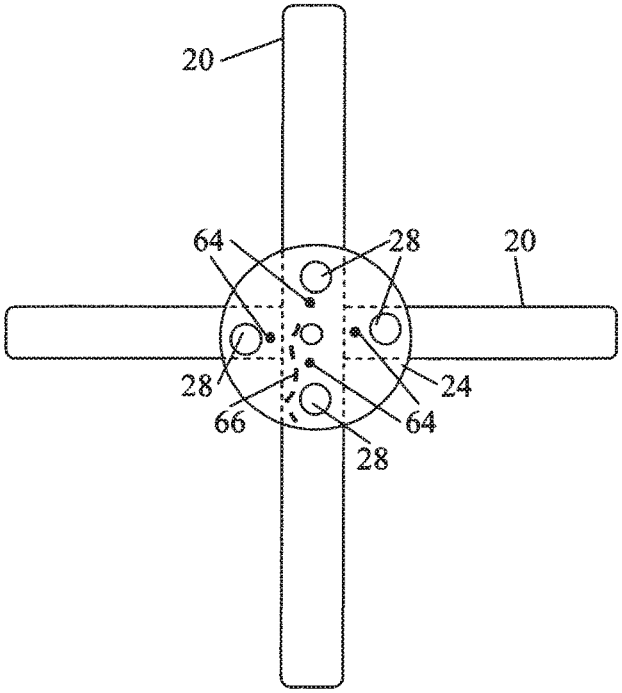
Figure 2G:
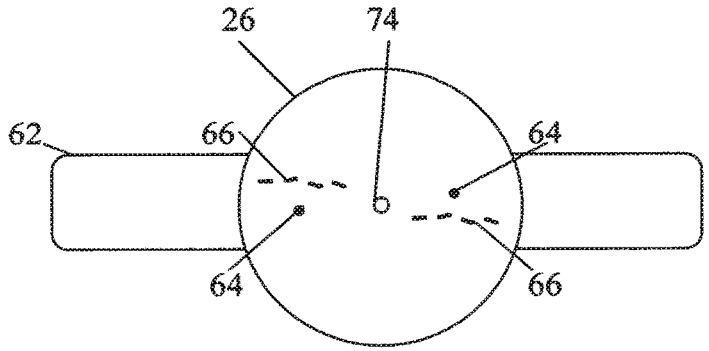

FIGS. 2C-2E illustrates how the small front circular brace plate (24) is attached to the rotational arm (20) by nails (64) and glue (66) in the one arm model. In the two arm model, the front brace plate is also attached by nails (64) and glue (66) as illustrated in FIGS. 2C, 2D, and 2F and 4J.

Operation Third Embodiment

Figure 9:
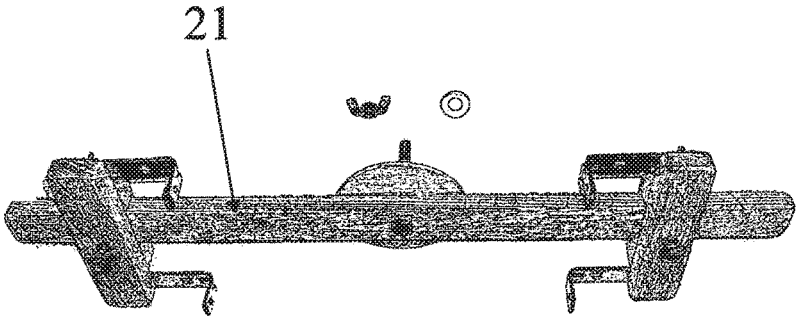
FIG. 9 illustrates a sketch of the rotating arm assembly, and the sliding bar clamps with a set of attached L-Grips.
Figure 10:
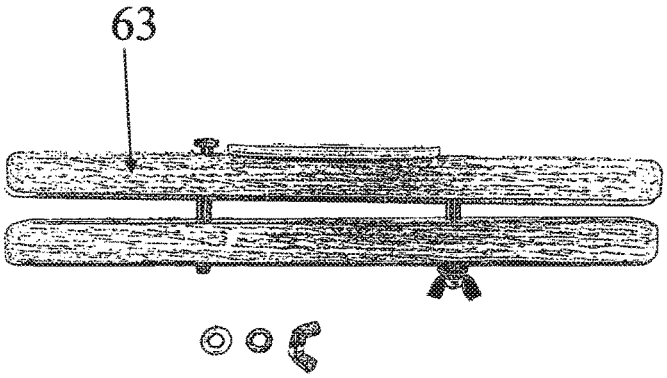
FIG. 10 a sketch of the clamping bar assembly.
Figure 11:
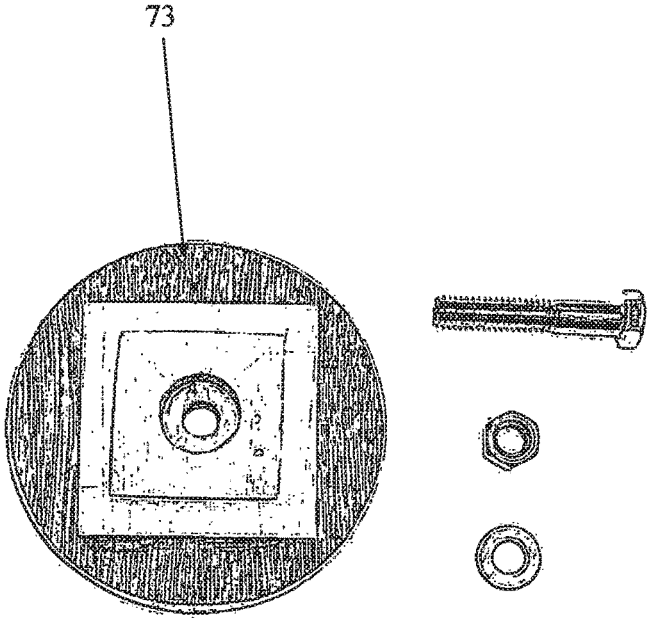
FIG. 11 a sketch that illustrates the camera tripod adapter assembly.

FIGS. 2A-2G, 3A-3C, 4A, 4J-4K, 5, 6B, 7 & 9, 13-16—Rotational Assembly The rotational assembly can be constructed with one or two rotational arms (20) and a pair of sliding bar clamps (22) slidably attached (FIG. 2A, 9). The L-grips (52) on the sliding bar clamps (22) are also optional equipment here. The rotating arm assembly (21) (FIG. 4A, FIG. 9) can be attached using a clamping bar assembly (FIG. 2C, FIG. 6B, and FIG. 10) to convert a standard easel; or to convert a camera tripod by using a tripod adapter (FIGS. 3A-3D, 7&11).

Figure 14:
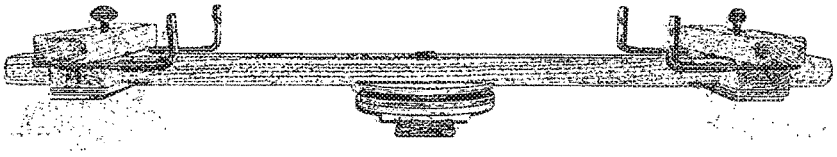
FIG. 14 is a sketch illustrating the coupling of the rotational assembly with the camera tripod assembly.
Figure 15:
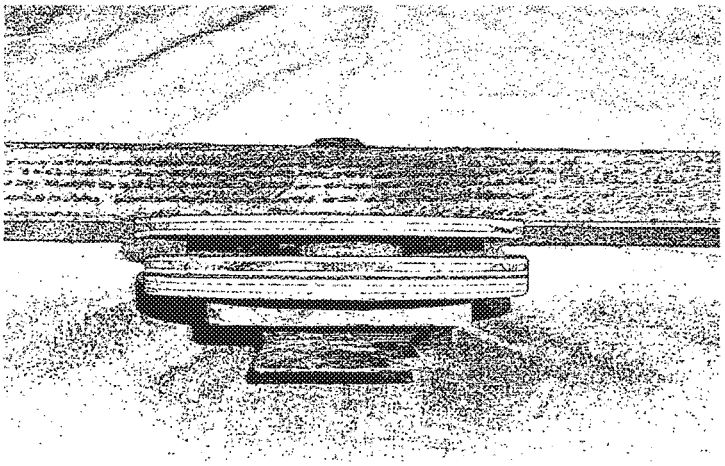
FIG. 15 is a zoom in sketch illustrating the coupling of the rotational assembly with the camera tripod assembly

This embodiment will work with the included easel stand in FIG. 1A-1F, and also can be used with many other existing easels to convert them into rotating easels. To convert other existing easels, drill additional holes into the center arm brace (82) using the holes in the front clamping bar as a template, or a template found in the instructions, and use the hardware shown in FIGS. 2A-2E & 10. If necessary, the rear clamping bar (62) can also be secured to the back of the center arm brace (82). Easels with a center arm brace (82) (FIGS. 6A, 6B & 16) can be modified by drilling holes large enough for the center and side hex bolts (46, 47) to pass through, and use the center arm brace (82) of the easel to function as, and replace the rear clamping bar (62), and then secure the rotational arm assembly (21) and clamping bar assembly (63) to the desired tension with flat washers (36, 38), the nylon locking wing nut (40), and lock nut washers (59) with wing nuts (41) to the back of the center arm brace (82). If necessary, the rear clamping bar (62) can also be secured to the center arm brace (82). The rotational arm assembly (21) attaches to either the clamping bar assembly (63) (FIG. 13) or the tripod adapter assembly (73) (FIGS. 14 & 15). The sliding bar clamps (22) slide, and secure themselves onto the rotational assembly to secure the work piece. Once secured, the work piece can then be rotated 360 degrees in either direction by swinging the rotational arm (20). The work piece is secured onto the rotational arm by the pressure of the sliding bar clamps (22) against the work piece (FIG. 5).

Fourth Embodiment

Figure 4A:
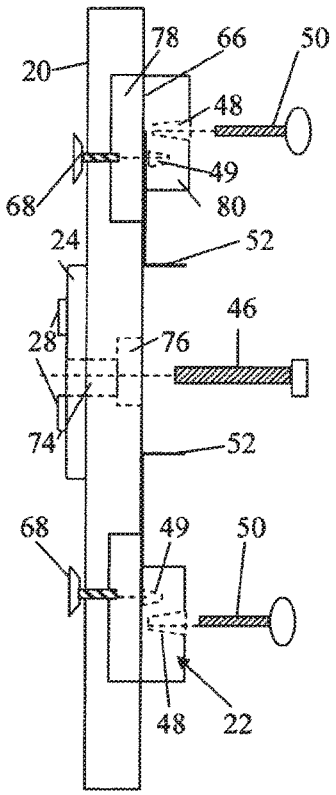
FIGS. 4A to 4K illustrate the rotational arm and a sliding bar clamp assembly.
Figure 4B:
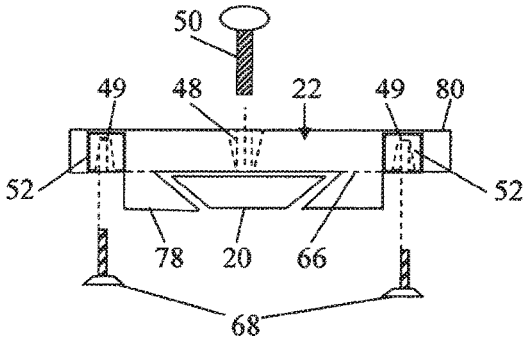
Figure 4C:
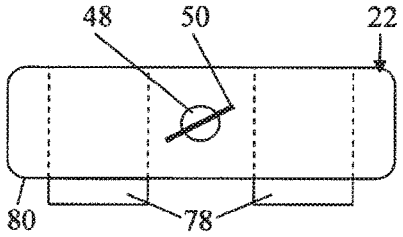
Figure 4D:
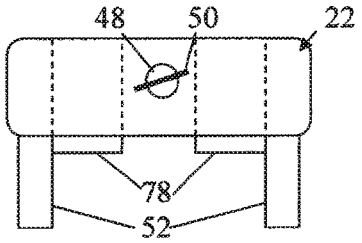
Figure 4E:
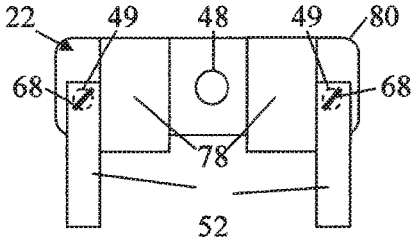

FIGS. 2A-2B, 3A-3B, 4A-4H, 5, 7, 9 & 12—Sliding Bar Clamps and L-Grips FIGS. 4A-4H & 9 illustrates in more detail how the sliding bar clamp assembly (22) is made and operates. FIG. 4A is a side view of the rotating arm assembly (21) with the sliding bar clamps (22) slidably attached. FIG. 4B shows a detailed top view of the sliding bar clamp (22) mounted on the rotational arm (20). The sliding bar clamp (22) is comprised of two pieces (FIG. 4C), the front facing bar (80) and the rear bar clamp guide and braces (78) and are glued together with the brace (78) having a lip overhanging the facing bar (80) to give more support to the canvas, or work piece. This feature is especially useful in the embodiments that use only one rotational arm (20) for support.

Figure 4F:
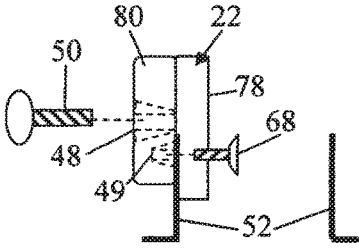
Figure 4G:
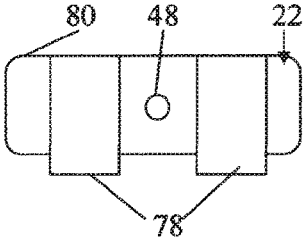
Figure 4H:
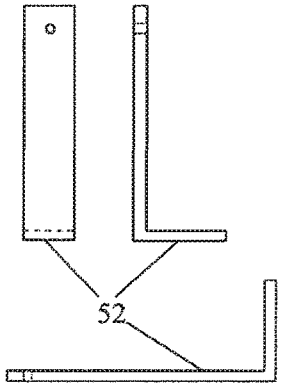
Figure 4I:
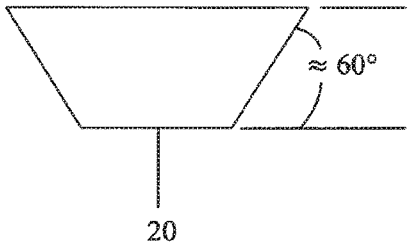

FIGS. 4D-4F & 4H illustrate the positioning of the bent flat bar L-grips (52) on the back side of the sliding bar clamp (22). A wing screw (68) secures the said L-grips (52) in place through a small insert nut (49) screwed into the back side of the front facing bar (80). FIG. 4F illustrates that the L-grip (52) can be attached in either direction depending on the item being rotated. Whether being used to pull on a canvas stretcher, or acting in reverse as a brace. The rotational arm (20) is cut at approximately a 60 degree angle with the rear bar clamp guide and brace (78) complementing this angle so the sliding bar clamps (22) can slide over and hug the rotational bar (20).

Figure 4J:
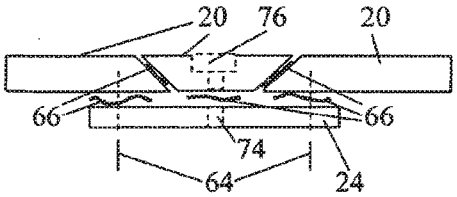
Figure 4K:
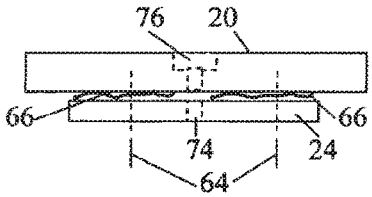

FIG. 4J shows a side view of how a two arm rotational arm embodiment is mated together. The rotational bars (20) are perpendicular to each other, and nailed and glued to the circular front brace plate (24). FIG. 4K shows the one rotational arm embodiment (20) (shown horizontally) being glued and nailed to the circular brace plate (24).

Operation of Fourth Embodiment

FIGS. 2A-2B, 3A-3B, 4A-4H, 5, 7, 9 & 12—Sliding Bar Clamps and L-Grips FIG. 4B illustrates how the complementary angles in the sliding bar clamp (22) and rotational arm (20) allow the bar clamp (22) to glide over the arm and secure the canvas onto the easel. The bar clamp (22) is secured onto the arm (20) by tightening the thumb screws (50) through the front insert nut (48) and into the rotational arm (20) so that the bar clamp fits snugly on the arm (20). The article being rotated is sandwiched between the two (or four) sliding bar clamps (22) and rests on the rotational arms (20), and the lip of the rear bar clamp guide and brace (78) and/or reversed L-grips (52). A bar clamp (22) with a lip is optional when combined with the L-grips (52) as the reversed L-grip also provides a bracing function. The snugness of the bar clamps (22) on the article is determined by the downward pressure on the bar clamp to the article being secured, and not by the tightening of the thumb screws (50).

L-grips (52) grab the canvas stretcher from behind, and the pulling now determines how snug the canvas is held. Again, tightening the thumb screws (50) on the bar clamp (22) only keeps the clamps from sliding on the rotating arm (20) and keeps the article from sliding out of place. FIG. 4F illustrates the L-grip (52) being secured with a wing screw (68) into the insert nut (49), with the L-grip pointing in either direction. FIG. 9 is a sketch of the L-Grips (52) on the rotational assembly (21). FIG. 12 is a sketch of how the L-Grips pull a canvas stretcher up from behind.

Fifth Embodiment

FIGS. 2A-2C, 6B, 10 & 13—Clamping Bar Assembly

The clamping bar assembly (63) (FIGS. 2A-2C, FIG. 6B, and FIG. 10) is comprised of a front and rear clamping bar (60, 62), a circular rear brace plate (26), two hex bolts (47), two flat washers (39), two lock nut washers (59), and two wing nuts (41). The rear of the rear brace plate is attached to the front of the front clamping bar with glue (66) and nails (64). A hole is drilled (74) in the center of the two clamping bars and rear brace plate for the large hex bolt (46) to pass though. Two holes are bored out (76) into the front face of the front clamping bar (60) on both sides of the rear brace plate just enough to securely seat the hex bolts. Two holes are then drilled completely through both the front and rear clamping bar through the already started bored out holes (FIG. 2C).

Operation Fifth Embodiment

FIGS. 2A-2C, 6B, 10 & 13—Clamping Bar Assembly

The front of the rear brace plate (26) (attached to the front clamping bar) interfaces with the felt pads on the rear of the front brace plate (FIGS. 2C-2D). The easel stand legs (42) (in FIGS. 1E, 2A-2C) are sandwiched by the front and rear clamping bars (60, 62) and are tightened to the legs by use of the hex bolts, washers, and wing nuts. The rotational arm assembly (21) is attached to the clamping bar assembly (63) (See FIG. 13) with the hex bolt (46), washer (38), lock nut washer (58) (optional), and nylon locking wing nut (40). Attach the sliding bar clamps and the apparatus is now ready to use (FIG. 2A, 2B). The rotational stiffness is determined by the tightness of the locking wing nut (40) on the hex bolt (46).

Sixth Embodiment

Figure 3A:
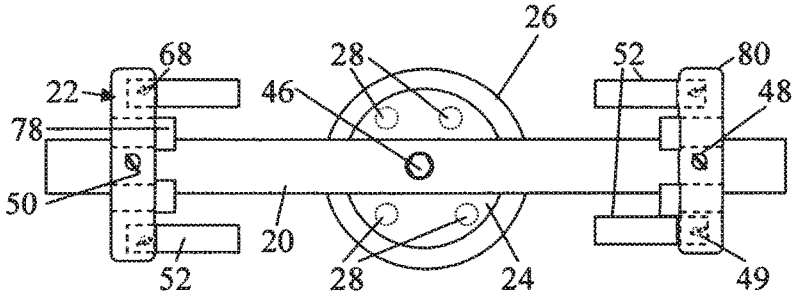
FIGS. 3A to 3D illustrate a clamp-on tripod embodiment in the one and two arm models.
Figure 3B:
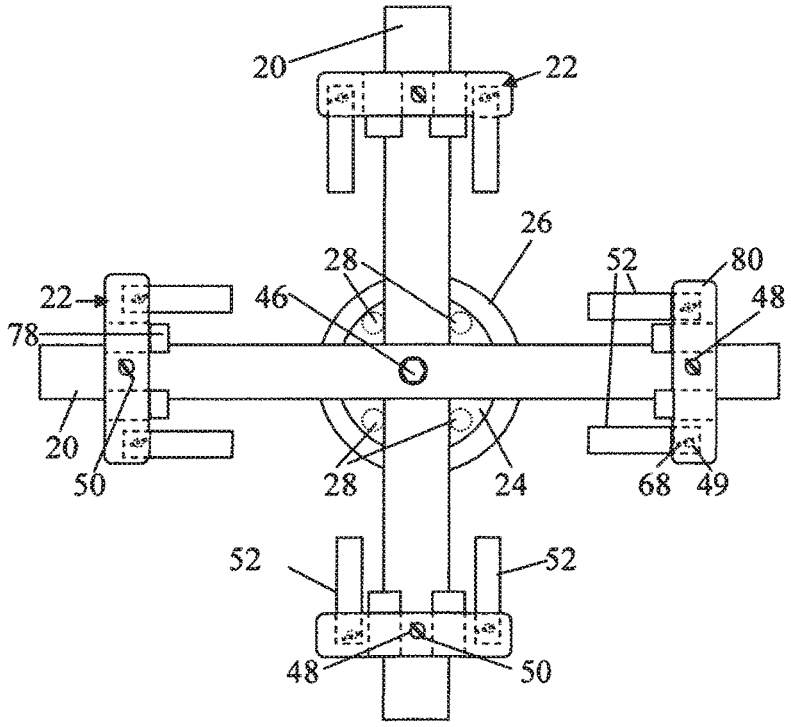
Figure 3C:
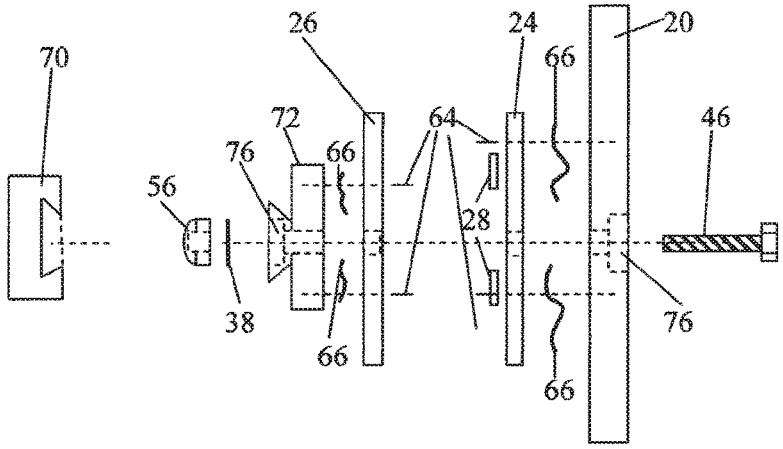
Figure 3D:
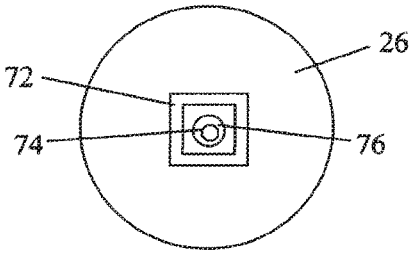

FIGS. 3C-3D, FIGS. 7, 11, 14 & 15—Male Clamp-On Camera Tripod Adapter FIGS. 3A-3D, 7, 11, 14 & 15 illustrates a detachable camera tripod mounted easel embodiment. The clamping bar assembly (63) (FIGS. 2C, 10) is replaced by the camera tripod adapter (72) in FIGS. 3C-D & 11. Instead of using clamping bars (60, 62) to attach onto a stationary easel stand's legs (42), this embodiment has a male tripod adapter (72) attached onto the back of the circular rear brace plate (26) themselves attached together with nails (64) and glue (66). The adapters can come from the camera tripod maker, or be readily manufactured in any useful material to fit the various tripod types that use a pop-out camera mount. FIG. 3C illustrates how the hex bolt (46) enters through the rotational arm (20), the brace plates (24, 26), the back of the adapter (72) (FIG. 3C) and is secured by the washer (38), and nylon lock nut (56) seated in the recessed bored and drilled out hole (76, 74). FIG. 3D is a rear view of the male adapter. The female tripod mount (70) (FIG. 3C) is found on the camera tripod (FIG. 7), and is mated by the male adapter (72) (FIG. 3C) on the camera tripod adapter.

Operation Sixth Embodiment

Figure 7:
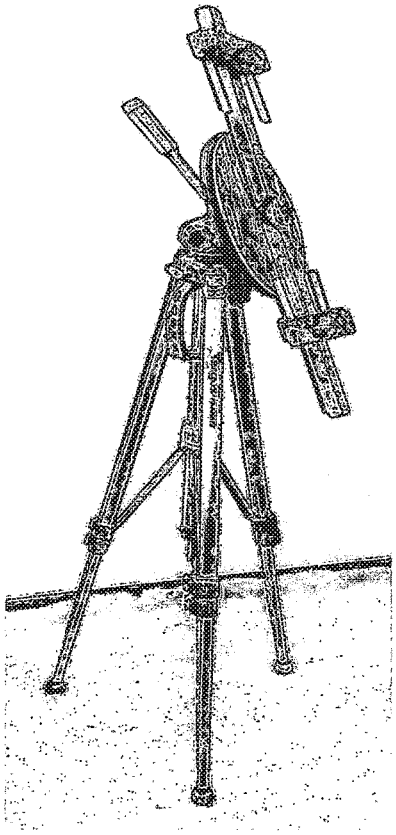
FIG. 7 illustrates the use of a clamp-on tripod assembly with an existing camera tripod.

FIGS. 3C-3D, FIGS. 7, 11, 14 & 15—Male Clamp-On Camera Tripod Adapter Functionally, this clamp-on tripod adapter assembly (FIGS. 3A, 3B, & FIG. 7) operates similar to the clamping bar embodiment in terms of securing a canvas or article, and rotating it in either direction a full 360 degrees. This embodiment uses a clamp-on male tripod adapter (72) to interface with an already existing camera tripod's female mount (70) turning the camera tripod into an easel with rotational, tilting, and height adjusting capabilities. Better made tripods not only allow height adjustments, but also allow the camera to swivel and tilt 90 to 180 degrees. This allows the operator to tilt a work piece from a near vertical to horizontal position, and also any angle in between. The operator secures the male adapter (72) into the female tripod mount (70) as one would do with a camera, and then adjust the tripod and the rotational easel to the desired height and angle. Attach the sliding bar clamps, secure the work piece, and the apparatus is now ready to use (FIG. 7). This embodiment clamps in and out of the tripod for use and transport. This makes for convenience, versatility, and economy of use.

Seventh Embodiment

Figure 8:
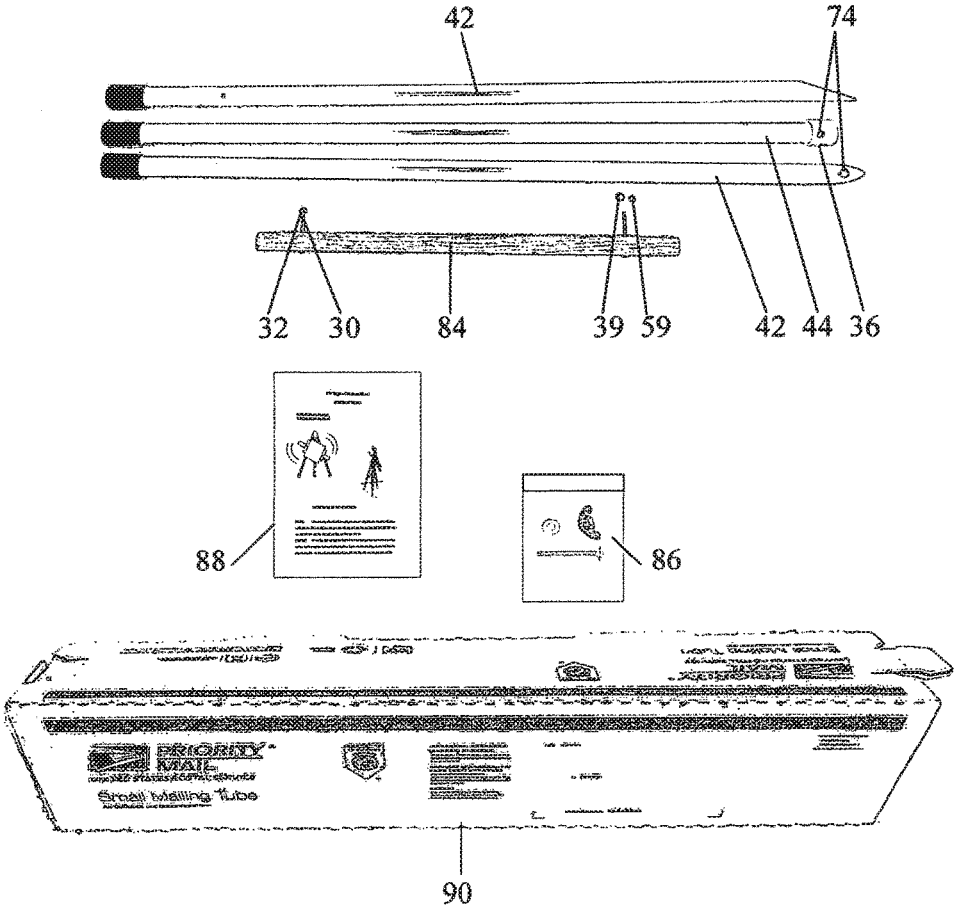
FIG. 8 illustrates a sketch of the portable tabletop easel stand with a package of hardware, a set of instructions, and a box for packaging.

FIG. 8—Package of Necessary Hardware

The necessary hardware to construct and operate these embodiments can be easily found at a local hardware store in case they are lost, broken, or minor changes in the parts are necessary (length, etc. . . . ) to modify the owner's existing specific easel design. The necessary packaged hardware include felt pads (28), screws (32), a carriage bolt (34), a PVC40 Cap Slip (36), flat washers (38, 39), wing nuts (40, 41), hex bolts (46, 47), thumb screws (50), bent flat bar L-Grip (52), vinyl caps (54), lock nut washers (58, 59), and wing screws (68).

Operation Seventh Embodiment

FIG. 8—Package of Necessary Hardware

The package of hardware comes with instructions to easily assemble the embodiments.

Eighth Embodiment

FIG. 8—Instructions

The written instructions include diagrams, a listing of parts, assembly directions, instructions for the use and care of the embodiments, templates to modify pre-existing easels, and instructions on overcoming obstacles in converting pre-existing easels.

Operation Eighth Embodiment

FIG. 8—Instructions

The instructions come in various languages, and are easy to follow. Instructions on the proper use and maintenance of the product, and the assembly of the embodiments are also included. Templates of the clamping bars can be used to line up the holes in the clamping bars to existing easels for drilling that need to be converted, and extra guidance on how to overcome obstacles on easels that need extra modifications for conversion.

Construction of the Embodiments

The building of this rotational easel is quite simple since there are few moving parts, all of which can be found at local home improvement stores, using a few common tools.

The included easel stand found in FIG. 1A-1F uses the included clamping bars, and is of standard design. The building of the easel stand requires three pieces of 1" PVC40 pipe cut to around 32". Two of these pieces need to be cut on a long angle on one end to become the side legs (42) (FIG. 2A). Holes should be drilled about ½" from the top of the angled ends using a ¼" drill bit. Next, cap (36) the center leg (44) and drill a ¼" hole through both sides about 1" from the top. Then attach the pieces as shown in FIGS. 1A & 1C using a carriage bolt (34), a small washer (39), and a small wing nut (41). Lastly, attach the three vinyl caps (54) to the bottom of the legs (42, 44) with glue (66).

Cut a piece of 1"33 2" hardwood about 24" long for the rotational arm (20). Bevel the two long edges with about a 60 degree angle on each side, Then cut your rear bar clamp guide and brace (78) pieces using the same complementary angle as shown in FIG. 4B-4G. Cut the front facing bars (80) about 8" to 10" in length to make the sliding bar clamp assembly (22).

Bore a hole half way through the center of the rotational arm (20) large enough for the head of the hex bolt to snugly fit into the recess. Then drill a ⅜" hole through the center of the bored out center hole in the rotational arm (20) and front brace plate (24) for the hex bolt (46) to pass through.

Glue and clamp the rear bar guide (78) onto the facing bar (80) and position it so (FIG. 4B) on the rotational arm (20) to ensure it will line up. After dried, drill another hole through the center of the facing bar (80) for the insert nut (48) and screw this nut into the facing bar (80). The thumb screw (50) screws into the bar clamp assembly (22) by way of the insert nut.

For the one arm or two arm models, common felt pads (28) with an adhesive back are attached onto the back side of the circular front brace plate (24). Place the ⅜" hex bolt (46) through the hole (see FIG. 2C) in the front of the arm (20), and front brace plate (24).

The clamping bar (63) and camera tripod adapter assemblies (73) employ the same rotational arm(s) (20) and sliding bar clamps (22). The one and two arm models requires a small circular brace plate (24) and the arms are attached at right angles to each other on the front brace plate (24) (see FIGS. 4J&4K). The felt pads (28) are attached with self-adhesive to the back of the small circular front brace plate (24) which itself is attached to the rotational arm(s) (20) by nails (64) and glue (66).

A front and a rear clamping bar (60, 62) are necessary to build the clamping bar assembly (63). Cut them both approximately 16" long for the easel. Center, and attach the rear brace plate (26) to the front of the front clamping bar (60) with glue (66) and nails (64). See FIGS. 2C, 2G, &10. Bore (76) two more holes to snugly recess the head of the ¼" hex bolt (47) into the front clamping bar (60) as shown in FIG. 2C. Drill ⅜" holes in the center of the clamping bars (60, 62) for the hex bolt (46) to travel through. Then drill two ¼" holes through the two clamping bars (60, 62) as shown in FIG. 2C. Attach the hardware, then clamp onto the easel with the legs (42) sandwiched between the front and rear clamping bars (60, 62). It's possible to adapt a one center arm brace (82) easel (see FIGS. 6A&6B) by drilling holes into the easel arm brace (82) to attach the rotating assembly (21) with the center arm brace (82) now sandwiched between the clamping bars (60, 62). The two side hex bolts (47) are used to clamp the clamping bars (60, 62) to the center arm brace (82) of the pre-existing easel. The center hex bolt (46) is used to pivotally attach the rotating arm assembly (21) to the clamping bars (60, 62) with the hex bolt (46), washer (38), and locking wing nut (40) (See FIG. 15). Other easels whose legs or bars will accommodate this clamping bar embodiment can also be modified with this detachable embodiment, and in some situations the rear clamping bar (62) may not be needed (See FIG. 16).

The clamp-on camera tripod and clamping bar embodiments use the identical rotational assembly (21). Now, instead, the circular rear brace plate (26) has a camera tripod adapter or a modified factory camera mount attached with glue (66) and nails (64) on its back side (see FIGS. 3C, 3D). The tripod adapter assembly then mounts on the camera tripod as the camera normally would (FIG. 7). Tension for the rotating arm assembly (21) is adjusted by compressing the felt pads (28) with the nylon lock nut (56), and hex bolt (46).

The sliding bar clamps (4A-4H) can be made with a simple design (FIGS. 4C, 4G) or with L-grips (52) to pull on the back of a canvas stretcher (FIG. 4A, 4B, 4D-4F, 4H & 12) by installing smaller insert nuts (49), wing screws (68), and bent flat iron L-grips (52) into the rear of the front facing bar (80) and attached as shown (FIG. 4F).

CONCLUSION, RAMIFICATION, AND SCOPE

The reader will see that the various embodiments of this rotating easel can be used by the operator to securely hold an article in place and to then rotate it 360 degrees in either direction. The clamping bar embodiment is able to clamp onto stationary easel legs and modify an existing easel to provide this rotational function.

The clamp-on camera tripod embodiment allows the user to modify a camera tripod to double as a rotating easel through the use of a camera tripod mount adapter. Many visual artists, who paint, also participate in photography, so this conversion option saves space and is economical in that the camera tripod and artist easel are now one unit.

The advantage of these embodiments over prior art is its simplicity in design and having few moving parts, it is relatively inexpensive to build, is easily manufactured, rotates a full 360 degrees in either direction, is light weight, sturdy, versatile, and provides the end user with an affordable, dependable, and easily repaired rotating easel.

The advantage of this rotational easel feature for a visual artist is that the canvas can now be easily rotated to view the composition. This feature now allows for easy painting in once awkward positions by easily adjusting the canvas angle. The artist doesn't dirty their hands nor the canvas by having to manually adjust the canvas while wet, and all the while not disrupting the painting process for the artist, or the presenter.

Multiple embodiments have been discussed in this application that take into account cost factors and additional capabilities such as using one or two rotational arms, a sliding bar clamp with a lip brace, and/or L-grips. Two rotational arms keep the article more secure but adds to the cost. L-grips allow for a canvas to be pulled up from the back so the artist can paint on all four edges of the canvas without interference from the bar clamps, but also adds to the cost.

Other additional features that could be added are a motor and a remote control to allow the rotating function to be controlled from a distance for a more ethereal experience by the artist or a presenter, or whomever can find a useful purpose for this embodiment; or a disabled artist forced to paint by foot and mouth and needs to rotate their canvas.

The ramifications of this conversion kit are now an artist or presenter does not have to abandon their old easels in order to have a rotational easel and many existing easels and camera tripods can now be easily and inexpensively modified. In addition, the parts are easily replaceable and available through your local hardware store. Thus, this conversion kit is also a good investment because of its useful advantages and potential life-span. Any presenter could also find use for this product if a rotational feature would be of benefit.

As for the scope of these embodiments, the parts could be made of many materials such as wood, metal, plastic, and even by a 3D printer. Variations and improvements in design are also possible. For example, the rotating arm could be square instead of beveled and the sliding bar clamps could be modified accordingly—all without affecting the effectiveness of the conversion features. The L-grips could be designed in several ways to perform the same function. There are several major types of camera mounts. A good deal of these types could be outfitted and included in this kit.

These embodiments can be made for any size easel using the same basic design and approach, and in different materials. The simplicity in the design of this rotating feature can easily be extended to larger and stationary models. The camera tripod, adapter, and rotational assembly could be merged into one bundle. And/or, the rotational assembly clamping bar assembly, standard easel, and camera tripod adapter could also be merged into another bundle. Other uses for this conversion and rotating feature could also be found for games, activities, and other purposes.

I claim:

1. A 360 degree rotating easel with a clamp-on device comprising:

at least one rotational arm with a front brace plate attached to the rear of said at least one rotational arm with a hole drilled through the center of said arm and front brace plate for a pivot bolt to pass through for providing rotation of said at least one rotational arm;

two clamping bars including a front and rear clamping bars secured onto the legs of an easel with bolts and fasteners there through, and employing a rear brace plate attached to the front of said front clamping bar with holes drilled through said front and rear clamping bars for the pivot bolt and securing bolts to pass there through, said front brace plate is secured to said rear brace plate for rotating the at least one rotational arm relative to the easel;

spacer pads adhered to the rear of said front brace plate and sandwiched between said front and rear brace plates to provide friction and aid the stability of said plates relative to each other;

at least two sliding bar clamps glide over said at least one rotational arm to tightly secure a canvas in place on said at least one rotational arm by a screw inserted perpendicularly into said bar clamps and into said rotational arm; [and]

L-grips attached to the rear of said sliding bar clamps for gripping a rear side of said canvas frame securing said canvas onto the rotational arm assembly through a downward pulling action by the feet of said L-grips of one of said sliding bar clamps, gripping onto said rear side of said canvas frame, thereby tightening in place the canvas onto said rotational arm by a screw inserted perpendicular into said bar clamps and into said rotational arm*; and*

*a tripod adapter connecting the rotational arm assembly to a camera tripod, the adapter consisting of a rear brace plate with a front, rear, and side surface, a mounting block attached to the rear surface of said brace plate, said mounting block includes a means to attach into the camera tripod head, and a bolt passing through and attached to the mounting block to provide a pivotal function for the rotating arm assembly.*

*2. A 360 degree rotating easel with a tripod adapter connecting device comprising:*

*at least one rotational arm with a front brace plate attached to the rear of said at least one rotational arm with a hole drilled through the center of said arm and front brace plate for a pivot bolt to pass through for providing rotation of said at least one rotational arm;*

*a tripod adapter connecting the rotational arm assembly to a camera tripod, the adapter consisting of a rear brace plate with a front, rear, and side surface, a mounting block attached to the rear surface of said brace plate, said mounting block includes a means to attach into the camera tripod head, and a bolt passing through and attached to the mounting block to provide a pivotal function for the rotating arm assembly;*

*spacer pads adhered to the rear of said front brace plate and sandwiched between said front and rear brace plates to provide friction and aid the stability of said plates relative to each other;*

*at least two sliding bar clamps glide over said at least one rotational arm to tightly secure a canvas in place on said at least one rotational arm by a screw inserted perpendicularly into said bar clamps and into said rotational arm; and*

*L-grips attached to the rear of said sliding bar clamps for gripping a rear side of said canvas frame securing said canvas onto the rotational arm assembly through a downward pulling action by the feet of said L-grips of one of said sliding bar clamps, gripping onto said rear side of said canvas frame, thereby tightening in place the canvas onto said rotational arm by a screw inserted perpendicular into said bar clamps and into said rotational arm.*

* * * * *